United States Patent
Voelker

(10) Patent No.: US 10,370,732 B2
(45) Date of Patent: Aug. 6, 2019

(54) METHODS FOR MITIGATING THE BUILDUP OF DIRECT REDUCED IRON CLUSTERS ON THE WALLS OF A DIRECT REDUCTION FURNACE

(71) Applicant: Brian Voelker, Concord, NC (US)

(72) Inventor: Brian Voelker, Concord, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 119 days.

(21) Appl. No.: 15/485,574

(22) Filed: Apr. 12, 2017

(65) Prior Publication Data

US 2017/0292168 A1 Oct. 12, 2017

Related U.S. Application Data

(60) Provisional application No. 62/321,219, filed on Apr. 12, 2016.

(51) Int. Cl.
*C21B 13/00* (2006.01)
*C21B 13/02* (2006.01)

(52) U.S. Cl.
CPC .......... *C21B 13/008* (2013.01); *C21B 13/004* (2013.01); *C21B 13/02* (2013.01); *Y02P 10/136* (2015.11)

(58) Field of Classification Search
CPC ...... C21B 13/008; C21B 13/02; C21B 13/004
See application file for complete search history.

(56) References Cited

U.S. PATENT DOCUMENTS 3,393,066 A * 7/1968 Mayer ................. C21B 13/0033
75/447
4,260,412 A * 4/1981 Summers ............ C21B 13/0073
48/202

FOREIGN PATENT DOCUMENTS

JP 5506415 A * 1/1980

OTHER PUBLICATIONS

Lepinski, J. A. "Iron by Direct Reduction." Kirk-Othmer Encyclopedia of Chemical Technology. pp. 1-15. doi:10.1002/0471238961. 0918151412051609.a02 (Year: 2000).*
Machine translation of JP S556415 (Year: 1980).*
JP 55006415 human translation. (Year: 1980).*

* cited by examiner

*Primary Examiner* — Tima M. McGuthry-Banks
(74) *Attorney, Agent, or Firm* — Clements Bernard Walker PLLC; Christopher L. Bernard

(57) ABSTRACT

A method for mitigating the buildup of direct reduced iron (DRI) clusters on the walls of a direct reduction (DR) furnace, including: injecting one or more of lime, dolomite, and another anti-sticking agent into a charge disposed within a reduction zone of the DR furnace by: (1) injecting the one or more of lime, dolomite, and another anti-sticking agent into a bustle gas stream upstream of or in a bustle of the DR furnace; (2) injecting the one or more of lime, dolomite, and another anti-sticking agent into the bustle gas stream through a pipe collocated with a bustle gas port through which the bustle gas stream is introduced into the DR furnace; and (3) injecting the one or more of lime, dolomite, and another anti-sticking agent directly into the reduction zone of the DR furnace separate from the bustle gas stream.

5 Claims, 3 Drawing Sheets

METHODS FOR MITIGATING THE BUILDUP OF DIRECT REDUCED IRON CLUSTERS ON THE WALLS OF A DIRECT REDUCTION FURNACE

CROSS-REFERENCE TO RELATED APPLICATION

The present patent application/patent claims the benefit of priority of U.S. Provisional Patent Application No. 62/321,219, filed on Apr. 12, 2016, and entitled "METHODS FOR MITIGATING THE BUILDUP OF DIRECT REDUCED IRON CLUSTERS ON THE WALLS OF A DIRECT REDUCTION FURNACE," the contents of which are incorporated in full by reference herein.

FIELD OF THE INVENTION

The present invention relates generally to methods for the direct reduction of iron. More specifically, the present invention relates to methods for mitigating the buildup of direct reduced iron (DRI) clusters on the walls of a direct reduction (DR) furnace.

BACKGROUND OF THE INVENTION

Referring specifically to FIG. 1, the Midrex process is a DR process using a vertical shaft reactor. Iron ore pellets, lump iron ore, or a combination of pellets and lumps are reduced in a vertical shaft or reduction furnace to metallic iron by means of a reducing gas. The reducing gas is produced from a mixture of natural gas and recycled gas from the reduction furnace. The mixture flows through catalyst tubes, where it is chemically converted into a gas containing $H_2$ and carbon monoxide (CO). The desired reducing gas temperature is typically in the range of 900° C. As the iron ore descends through the reduction furnace by gravity flow, the gas ascends through the material column and removes oxygen from the iron carriers. The product DRI is typically 90% to 94% metallic iron. After the DRI exits from the bottom of the vertical shaft reactor, it can be cooled and stored as cold DRI (CDRI), compressed into hot briquetted iron (HBI) and stored, and/or transported as hot DRI (HDRI), for example. A derivative of the Midrex process can use coal through gasification (MXCOL technology) as well.

The process offers the following benefits:
Using natural gas and agglomerated iron ore makes the process simple;
The packed reactor with the counter-current flow of reactants provides high efficiency;
As the doubling of capacity requires only a 40% increase in the reactor diameter, the technology offers good economies of scale; and
The process is highly flexible with regards to iron ore reducing gas sources and plants can operate at a wide spectrum of hydrogen to carbon monoxide ratios (0.5 to 3.5).

This DRI production process is highly energy efficient, and further energy gains are realized if the HDRI, for example, is immediately transferred to an electric arc furnace (EAF) melt shop or the like. In this manner, the heat from the DR process lowers the cost of melting the DRI in the EAF, significantly cutting energy costs and electrode consumption. The Midrex process represents 70% of the installed DRI capacity worldwide. Other comparable DR processes are also contemplated for use herein.

Currently, numerous operating plants experience the buildup of sintered DRI on the walls of the furnaces used. This buildup can cause the bustle ports to become blocked, preventing gas from properly being distributed through the reduction zone of the furnace. Also, the buildup can suddenly break loose, causing blockages downstream in the furnace discharge. Previous attempts to reduce such buildup came primarily from sizing the ports differently to increase velocity through the ports or changing the refractory design to eliminate any ledges or places for buildup to initiate. These design changes have been largely ineffective, or, at best, it is inconclusive as to whether or not they help to reduce the problem. Thus, what are still needed in the art are methods for reducing the buildup of sintered DRI on the walls of the furnaces used.

BRIEF DESCRIPTION OF THE DRAWINGS

The present invention is illustrated and described herein with reference to the various drawings, in which like reference numbers are used to denote like system components/method steps, as appropriate, and in which.

BRIEF SUMMARY OF THE INVENTION

Figure 1:
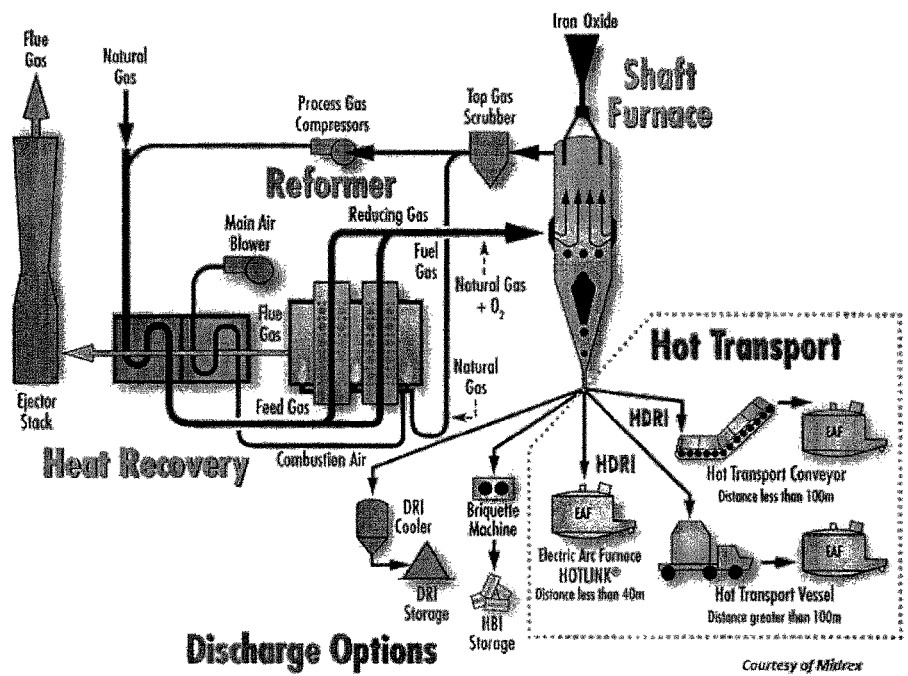
FIG. 1 is a schematic diagram illustrating one exemplary embodiment of the Midrex process of the present invention (it should be noted that other comparable DR processes are also contemplated for use herein)

By injecting lime, dolomite, and/or another anti-sticking agent into the bustle gas stream within the DR furnace, the agent will coat the pellets or lumps at the hottest and most vulnerable portion of the reduction zone. The agent can be injected as a powder or slurry into the reducing gas stream and will be carried with the reducing gas stream until the gases enter the furnace through the gas ports. The ideal site of injection for a given application will be found through experimentation or computational modelling. However, preferred injection sites are: 1) upstream of the furnace bustle, 2) in the bustle itself around the perphery, and/or 3) through a pipe in the center of some of the bustle gas ports. Another alternative would be to inject the agent directly into the furnace. This technology could easily be applied to new DR furnaces or retrofitted to existing plants where buildup is a problem.

Lime, dolomite, and/or another anti-sticking agent is conveyed pneumatically or slurrified in water and pumped to the level of the furnace bustle. From there, it is metered and injected into the bustle gas stream in one of the three locations, for example. The exact method of injection will depend on the material particle size, method of conveying, number of injection points, and injection location. For dry injection, the equipment employed (due to the temperature of the bustle gas) could be a water cooled lance. A similar injection mechanism can be found in the EAF industry, where lime is pneumatically injected into a liquid bath via a subsonic or supersonic lance arrangement. If it is injected into the furnace directly, a method similar to the way pulverized coal is injected into a blast furnace could be used.

For slurry injection, a water nozzle could be used to atomize or directly spray the mixture into the bustle gas. Whatever is used for the carrier of the agent could present its own problems with reactions in the furnace reduction zone. Some carriers contemplated are air and water, however an inert gas, such as nitrogen or dry seal gas, could also be used.

In one exemplary embodiment, the present invention provides a method for mitigating the buildup of direct reduced iron (DRI) clusters on the walls of a direct reduction (DR) furnace, comprising: injecting one or more of lime, dolomite, and another anti-sticking agent into a charge disposed within a reduction zone of the DR furnace, wherein the one or more of lime, dolomite, and another anti-sticking agent is injected into the charge by one or more of: (1) injecting the one or more of lime, dolomite, and another anti-sticking agent into a bustle gas stream upstream of a bustle of the DR furnace; (2) injecting the one or more of lime, dolomite, and another anti-sticking agent into the bustle gas stream in the bustle of the DR furnace; (3) injecting the one or more of lime, dolomite, and another anti-sticking agent into the bustle gas stream through a pipe collocated with a bustle gas port through which the bustle gas stream is introduced into the DR furnace; and (4) injecting the one or more of lime, dolomite, and another anti-sticking agent directly into the reduction zone of the DR furnace separate from the bustle gas stream. The other anti-sticking agent comprises one or more of bauxite, serpentine, bentonite, and portland cement. The one or more of lime, dolomite, and another anti-sticking agent comprise one of a powder and a slurry. The one of a powder and a slurry is disposed in a carrier. The one or more of lime, dolomite, and another anti-sticking agent coats the charge disposed within a reduction zone of the DR furnace.

In another exemplary embodiment, the present invention provides a system for mitigating the buildup of direct reduced iron (DRI) clusters on the walls of a direct reduction (DR) furnace, comprising: a conduit for injecting one or more of lime, dolomite, and another anti-sticking agent into a charge disposed within a reduction zone of the DR furnace, wherein the one or more of lime, dolomite, and another anti-sticking agent is injected into the charge by one or more of: (1) injecting the one or more of lime, dolomite, and another anti-sticking agent into a bustle gas stream through a conduit upstream of a bustle of the DR furnace; (2) injecting the one or more of lime, dolomite, and another anti-sticking agent into the bustle gas stream through a conduit in the bustle of the DR furnace; (3) injecting the one or more of lime, dolomite, and another anti-sticking agent into the bustle gas stream through a pipe collocated with a bustle gas port through which the bustle gas stream is introduced into the DR furnace; and (4) injecting the one or more of lime, dolomite, and another anti-sticking agent directly into the reduction zone of the DR furnace separate from the bustle gas stream through a conduit disposed through a wall of the DR furnace. The other anti-sticking agent comprises one or more of bauxite, serpentine, bentonite, and portland cement. The one or more of lime, dolomite, and another anti-sticking agent comprise one of a powder and a slurry. The one of a powder and a slurry is disposed in a carrier. The one or more of lime, dolomite, and another anti-sticking agent coats the charge disposed within a reduction zone of the DR furnace.

In a further exemplary embodiment, the present invention provides a direct reduction (DR) furnace for mitigating the buildup of direct reduced iron (DRI) clusters on the walls of the DR furnace, comprising: a conduit for injecting one or more of lime, dolomite, and another anti-sticking agent into a charge disposed within a reduction zone of the DR furnace, wherein the one or more of lime, dolomite, and another anti-sticking agent is injected into the charge by one or more of: (1) injecting the one or more of lime, dolomite, and another anti-sticking agent into a bustle gas stream through a conduit upstream of a bustle of the DR furnace; (2) injecting the one or more of lime, dolomite, and another anti-sticking agent into the bustle gas stream through a conduit in the bustle of the DR furnace; (3) injecting the one or more of lime, dolomite, and another anti-sticking agent into the bustle gas stream through a pipe collocated with a bustle gas port through which the bustle gas stream is introduced into the DR furnace; and (4) injecting the one or more of lime, dolomite, and another anti-sticking agent directly into the reduction zone of the DR furnace separate from the bustle gas stream through a conduit disposed through a wall of the DR furnace. The other anti-sticking agent comprises one or more of bauxite, serpentine, bentonite, and portland cement. The one or more of lime, dolomite, and another anti-sticking agent comprise one of a powder and a slurry. The one of a powder and a slurry is disposed in a carrier. The one or more of lime, dolomite, and another anti-sticking agent coats the charge disposed within a reduction zone of the DR furnace.

DETAILED DESCRIPTION OF THE INVENTION

Referring specifically to FIG. 2, again, by injecting lime, dolomite, and/or another anti-sticking agent 10 into the bustle gas stream 12 within the DR furnace 5, the agent 10 will coat the pellets or lumps (not illustrated) at the hottest and most vulnerable portion of the reduction zone 14. The agent 10 can be injected as a powder or slurry into the reducing gas stream 12 and will be carried with the reducing gas stream 12 until the gases enter the furnace 5 through the gas ports 16.

In general, the iron oxide charge 18 is fed continuously from the top of the furnace 5, passing uniformly through the preheating 20, reduction 14, transition 22, and cooling zones 24 of the furnace 5. The reducing gas consists of about 95% combined hydrogen and carbon monoxide. It is heated to a temperature range of 1400° to 1700° F. and is fed in from below the reduction zone 14. The gas flows countercurrent to the descending solids. At the top of the furnace 5, the partially spent reducing gas 12 (approximately 70% hydrogen and carbon monoxide) exists and is recompressed, enriched with natural gas, preheated to 750° F., and transported to the associated reformer (not illustrated). The reformer reforms the mixture back to 95% hydrogen and carbon monoxide, which is then ready for re-use by the furnace 5. In the cooling zone, the cooling gases flow countercurrent to the DRI. At the top of the cooling zone, the cooling gases exit, are sent to recycling, then return to the bottom of the cooling zone. The cooled DRI is discharged through the bottom of the furnace 5, after which it is screened for the removal of fines, and treated to minimize the danger of spontaneous ignition during extended storage. The reduced fines are briquetted to produce a usable DRI product, for example.

Figure 3:
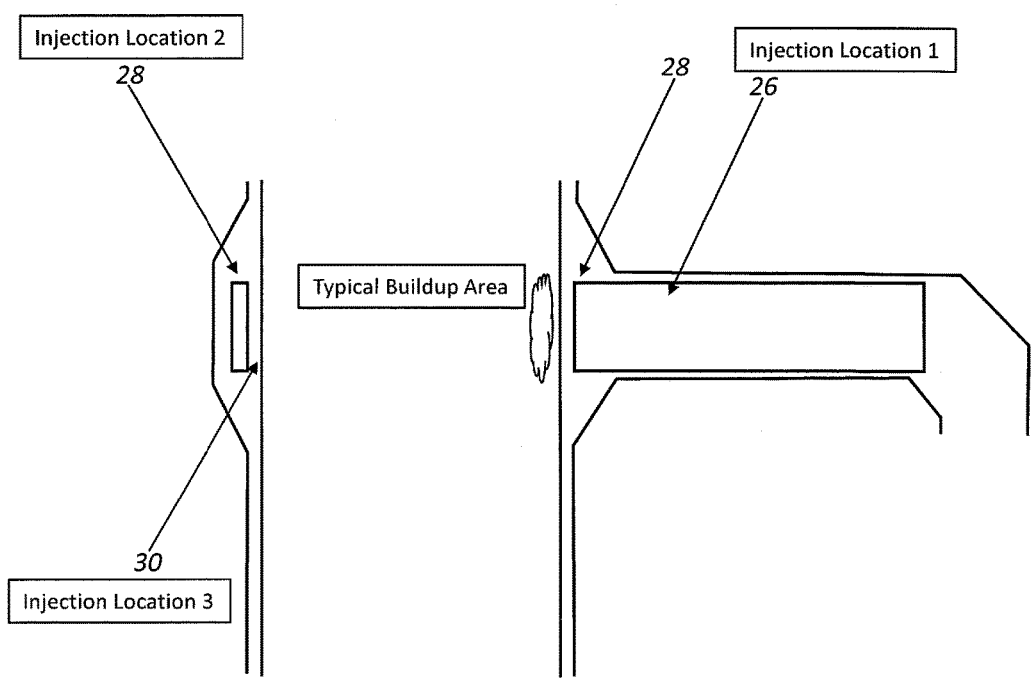
FIG. 3 is another schematic diagram illustrating one exemplary embodiment of the method for mitigating the buildup of DRI clusters on the walls of a DR furnace of the present invention.

Referring specifically to FIG. 3, the ideal site of injection for a given application will be found through experimentation or computational modelling. However, preferred injection sites are: 1) upstream 26 of the furnace bustle 28, 2) in the bustle 28 itself around the perphery, and/or 3) through a pipe in the center of some of the bustle gas ports 30. In general, these are areas where DRI clusters typically form.

Figure 2:
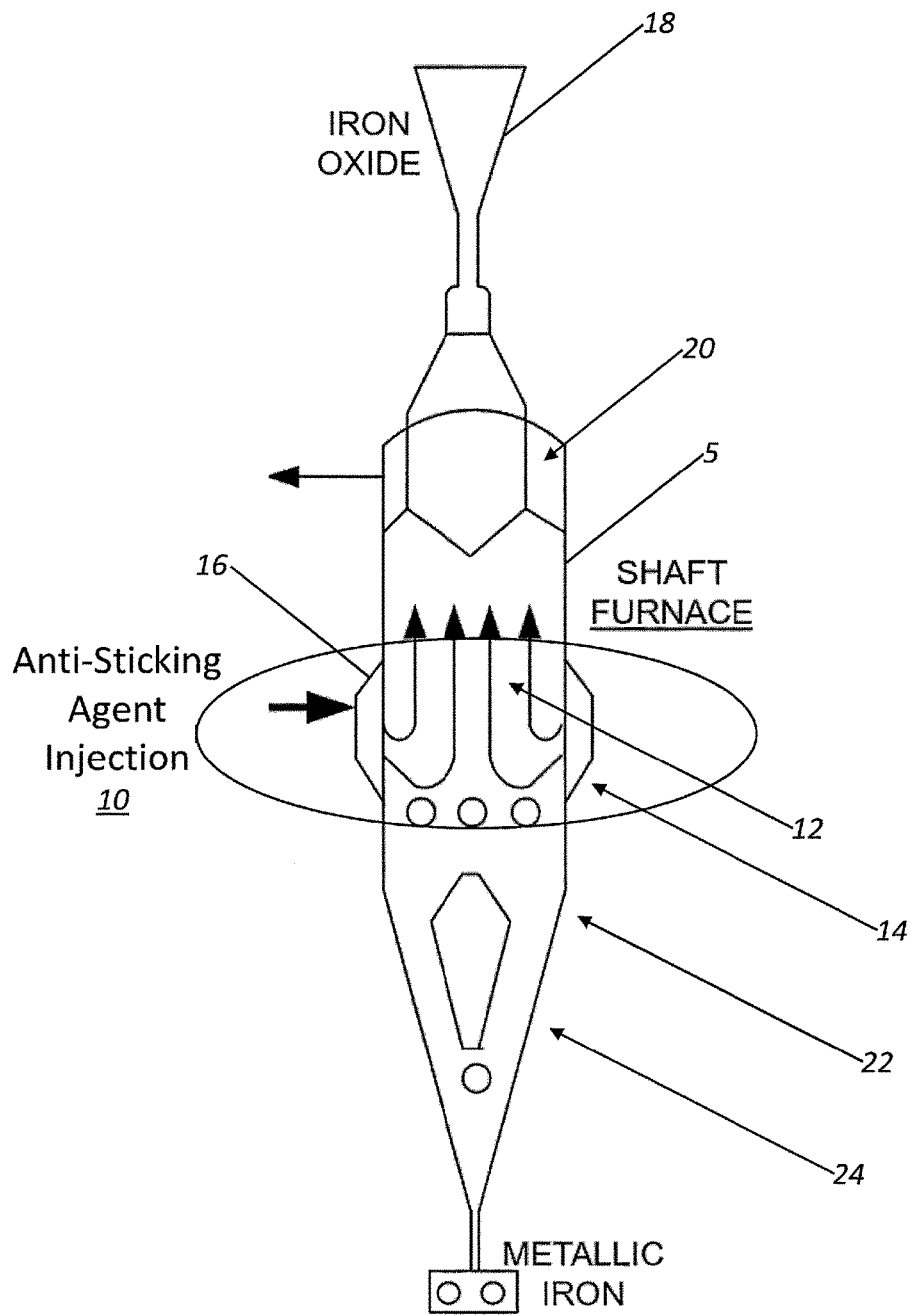
FIG. 2 is a schematic diagram illustrating one exemplary embodiment of the method for mitigating the buildup of DRI clusters on the walls of a DR furnace of the present invention.

Another alternative would be to inject the agent directly into the furnace 5 through a suitable conduit, separate from the bustle gas stream 12 (FIG. 2). This technology could easily be applied to new DR furnaces or retrofitted to existing plants where buildup is a problem.

Lime, dolomite, and/or another anti-sticking agent 10 is conveyed pneumatically or slurrified in water and pumped to the level of the furnace bustle 28. From there, it is metered and injected into the bustle gas stream 12 in one of the three locations, for example. The exact method of injection will depend on the material particle size, method of conveying, number of injection points, and injection location. For dry injection, the equipment employed (due to the temperature of the bustle gas 12) could be a water cooled lance. A similar injection mechanism can be found in the EAF industry, where lime is pneumatically injected into a liquid bath via a subsonic or supersonic lance arrangement. If it is injected into the furnace 5 directly, a method similar to the way pulverized coal is injected into a blast furnace could be used. For slurry injection, a water nozzle could be used to atomize or directly spray the mixture into the bustle gas 12. Whatever is used for the carrier of the agent 10 could present its own problems with reactions in the furnace reduction zone 14. Some carriers contemplated are air and water, however an inert gas, such as nitrogen or dry seal gas, could also be used.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A method for mitigating the buildup of direct reduced iron (DRI) clusters on the walls of a direct reduction (DR) furnace, comprising:
   injecting one or more of lime, dolomite, and another anti-sticking agent into a charge disposed within a reduction zone of the DR furnace, wherein the one or more of lime, dolomite, and another anti-sticking agent is injected into the charge by one or more of:
   (1) injecting the one or more of lime, dolomite, and another anti-sticking agent into the bustle of the DR furnace separate from the bustle gas stream;
   (2) injecting the one or more of lime, dolomite, and another anti-sticking agent into the bustle gas stream through a pipe disposed in a center portion of a bustle gas port through which the bustle gas stream is introduced into the DR furnace; and
   (3) injecting the one or more of lime, dolomite, and another anti-sticking agent directly into the reduction zone of the DR furnace separate from a reducing gas stream.

2. The method of claim 1, wherein the another anti-sticking agent comprises one or more of bauxite, serpentine, bentonite, and portland cement.

3. The method of claim 1, wherein the one or more of lime, dolomite, and another anti-sticking agent comprise one of a powder and a slurry.

4. The method of claim 3, wherein the one of a powder and a slurry is disposed in a carrier.

5. The method of claim 1, wherein the one or more of lime, dolomite, and another anti-sticking agent coats the charge disposed within a reduction zone of the DR furnace.

* * * * *